(12) United States Patent
Elsässer et al.

(10) Patent No.: US 7,461,644 B2
(45) Date of Patent: Dec. 9, 2008

(54) METHOD FOR CONTROLLING AN INTERNAL COMBUSTION ENGINE

(75) Inventors: Alfred Elsässer, Keltern (DE); Jörg Rückauf, Schwieberdingen (DE)

(73) Assignee: MAHLE International GmbH, Stuttgart (DE)

(*) Notice: Subject to any disclaimer, the term of this patent is extended or adjusted under 35 U.S.C. 154(b) by 0 days.

(21) Appl. No.: 11/789,591

(22) Filed: Apr. 25, 2007

(65) Prior Publication Data
US 2008/0035127 A1 Feb. 14, 2008

(30) Foreign Application Priority Data
May 19, 2006 (DE) .................. 10 2006 023 853

(51) Int. Cl.
*F02D 41/00* (2006.01)
*F02D 41/04* (2006.01)
(52) U.S. Cl. .................. 123/683; 123/403; 123/336
(58) Field of Classification Search .................. 123/403, 123/679, 683, 687, 336, 184.42, 184.43, 123/184.47, 184.48
See application file for complete search history.

(56) References Cited

U.S. PATENT DOCUMENTS

| 4,509,327 | A | * | 4/1985 | Enga | 60/274 |
| 4,617,896 | A | * | 10/1986 | Yoshikawa | 123/432 |
| 5,299,549 | A | * | 4/1994 | Schatz | 123/672 |
| 5,671,708 | A | | 9/1997 | Ichinose et al. | |
| 5,722,365 | A | | 3/1998 | Sadakane et al. | |
| 2007/0051343 | A1 | | 3/2007 | Weiss et al. | |

FOREIGN PATENT DOCUMENTS

| DE | 197 54 287 A1 | 6/1999 |
| DE | 102 20 076 A1 | 11/2003 |
| DE | 10 2004 048 705 A1 | 4/2005 |
| DE | 103 44 759 A1 | 5/2005 |

OTHER PUBLICATIONS

Pischinger, Variable Valve Control II, Expert Publishers, pp. 244-260.

* cited by examiner

*Primary Examiner*—Mahmoud Gimie
(74) *Attorney, Agent, or Firm*—Collard & Roe, P.C.

(57) ABSTRACT

A method for controlling a dethrottled internal combustion engine, which has a shared fresh gas line which supplies fresh gas to fresh gas pipes, which in turn supply fresh gas to each cylinder. The engine has at least one intake valve per cylinder, a clocked valve per fresh gas pipe for opening and closing the gas pipe and a fuel injector for each cylinder, for metered addition of fuel. The chronological location of the injection time of the fuel is adjusted for the respective cylinder as a function of a point in time of a change in the switch position of the respective clocked valve, to improve the emission values of the engine. In addition, the clocked valves are controlled so that the metered addition of fresh gas is accomplished for the respective cylinder.

6 Claims, 1 Drawing Sheet

METHOD FOR CONTROLLING AN INTERNAL COMBUSTION ENGINE

CROSS REFERENCE TO RELATED APPLICATIONS

Applicants claim priority under 35 U.S.C. §119 of German Application No. 10 2006 023 853.2 filed May 19, 2006.

BACKGROUND OF THE INVENTION

The present invention relates to a method for controlling a dethrottled internal combustion engine. The invention also relates to a device for controlling a dethrottled internal combustion engine. In addition, the invention relates to a dethrottled internal combustion engine equipped with such a control device.

DE 103 44 759 A1 discloses a method for controlling an internal combustion engine. The internal combustion engine controlled by the known method comprises a joint fresh gas line that supplies fresh gas to a plurality of fresh gas pipes which in turn each carry fresh gas to a cylinder. The internal combustion engine also comprises at least one intake valve per cylinder and also one pulse charging valve per fresh gas pipe for opening and closing the respective fresh gas pipe. Furthermore, a fuel injector for metered addition of fuel is provided for each cylinder. The internal combustion engine is throttled and accordingly has a throttle device, in particular a throttle valve, in the fresh gas line for load-dependent throttling of the fresh gas supplied to the individual cylinders. With the known control method, the chronological position of the injection time of the fuel is adjusted for each cylinder as a function of a point in time of a change in the switch position of the respective pulse charging valve. By coordinating the fuel injection with the pulse charging, the mixture formation process and thus the internal combustion process can be improved with respect to reducing emissions. In pulse charging by means of pulse charging valves, hydrodynamic effects are utilized to improve the fresh gas charge to the individual cylinders.

A dethrottled internal combustion engine is known from Pischinger, *Variable Valve Control II*, Expert Publishers, pages 244 to 260; this design is characterized by the lack of a load-dependent throttle mechanism in the joint fresh gas line. To nevertheless be able to implement a fresh gas charging of the individual cylinders as a function of the prevailing load state of the internal combustion engine with the known dethrottled internal combustion engine, the opening and closing times of the intake valves are adapted accordingly in the case of the known internal combustion engine. To do so, the known internal combustion engine works with an electromagnetic valve control for the intake valves which makes it possible to arbitrarily open and close the intake valves. Such electromagnetic valve controls are much more expensive, however, than traditional valve drives controlled by camshafts. A throttle-free or dethrottled fresh gas supply to the internal combustion engine also leads to a reduced gas exchange work and to an improved quality of the combustion process, which in turn results in reduced emissions and fuel consumption values.

SUMMARY

The present invention relates to the problem of showing a method for an internal combustion engine that will permit reduced fuel consumption and can be implemented comparatively inexpensively.

This problem is achieved according to this invention by the subjects of the independent claims. Advantageous embodiments are the subject of the dependent claims.

The invention is based on the general idea of implementing the fresh gas flow rate control in a dethrottled internal combustion engine with the help of clocked valves arranged in the individual fresh gas pipes, whereby at the same time the fuel injection is coordinated with the switching times of the clocked valves. The quantity of fresh gas or the fresh gas charge required for the respective load state of internal combustion engine can be adjusted in a controlled manner on each cylinder through a suitable choice of the closing points in time and the opening points in time of the individual clocked valves. A throttle mechanism for load-dependent throttling of the fresh gas supply is thus dispensable. To this extent, the present invention makes use of the advantages of a dethrottled internal combustion engine. In conjunction with the clocked valves which can be produced relatively inexpensively, an inexpensive approach is thus obtained. Furthermore, the coordination of the injection processes with the clock points of the clocked valves also leads to an additional improvement in the combustion process. Thus, on the whole, a definite improvement in the combustion process can be achieved with regard to emissions and fuel consumption in a comparatively inexpensive manner.

In an advantageous embodiment, the clocked valves can be controlled at least during partial-load operation of the internal combustion engine so that there are at least two fresh gas charging phase at a distance from one another in time in the respective cylinder during an intake cycle. During the first charging phase, there is a more or less basic charging of the respective cylinder which can be utilized to advantage to produce the mixture, for example. With the second charging phase, the desired flow state, e.g., spiral flow and/or tumble flow, can be produced in the combustion chamber at a point in time that is comparatively close to the ignition point in time, which is also advantageous from the standpoint of pollution emissions and the efficiency of the combustion process.

In the case of a controller operating with two or more fresh gas charging phases, it may be advantageous, at least for certain operating states of the internal combustion engine, for a separate fuel injection to be performed during each of two separate fresh gas charging phases. For example, the second fuel injection allows the mixture produced with the help of the first injection to be made richer to thereby significantly increase the ignitability of the overall charging.

Additional important features and advantages of the invention are derived from the subclaims, the drawings and the respective description of figures on the basis of the drawings.

It is self-evident that the features mentioned above and those yet to be explained below may be used not only in the particular combination given but also in other combinations or alone without going beyond the scope of the present invention.

BRIEF DESCRIPTION OF THE DRAWINGS

Preferred exemplary embodiments of the present invention are illustrated in the drawings and explained in greater detail in the following description, where the same reference numerals are used to refer to the same or similar or functionally identical components.

The figures each show in schematic diagrams

DETAILED DESCRIPTION OF THE PREFERRED EMBODIMENTS

Figure 1:
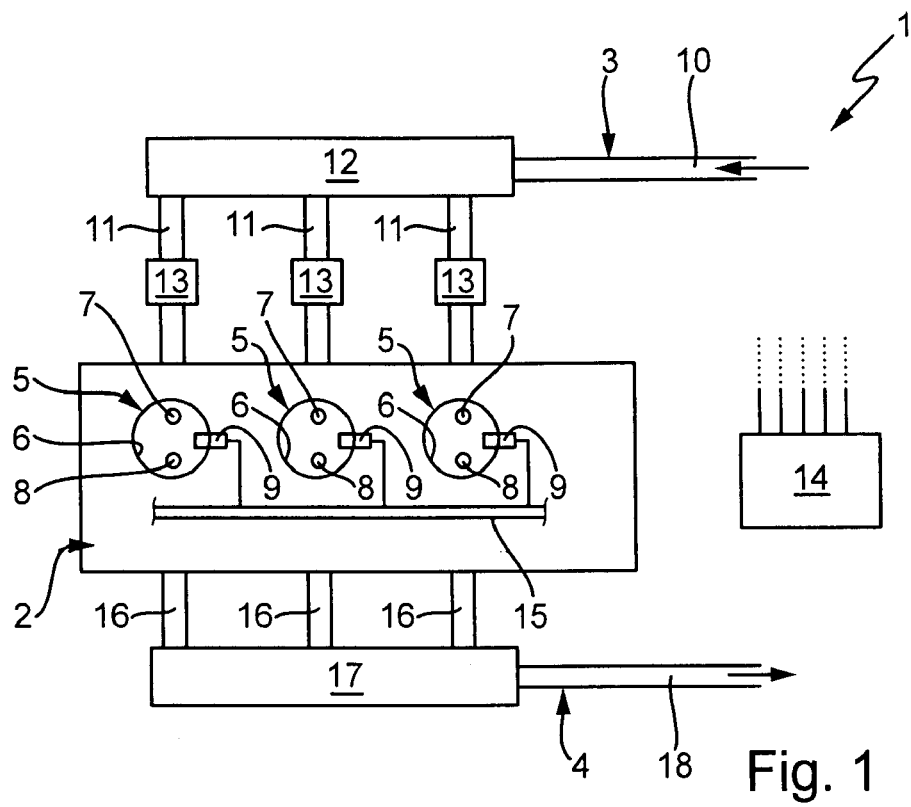
FIG. 1 a greatly simplified basic diagram of an internal combustion engine like a wiring diagram, FIG. 2 a diagram in which the switch states of an intake valve, a clocked valve and a fuel injector are shown as a function of a piston lift.

According to FIG. 1, an internal combustion engine 1 comprises an engine block 2, a fresh gas system 3, which supplies fresh gas to the engine block 2, and an exhaust system 4, which removes exhaust gas from the engine block 2. The internal combustion engine 1 is preferably arranged in a motor vehicle.

The engine block 2 contains multiple cylinders 5; three cylinders 5 are shown in this example without restricting the general scope in any way. Each cylinder 5 encloses a combustion chamber 6 and guides a piston (not shown) in a known manner. At least one intake valve 7 and at least one exhaust valve 8 are allocated to each cylinder 5. The intake valves 7 are designed and arranged in such a way that they are able to open and close a fresh gas intake, not discussed further here, of the respective combustion chamber 6 in the usual manner. In a corresponding manner, the exhaust valves 8 are designed and arranged in such a way that they are able to open and close an exhaust outlet (not shown) of the respective combustion chamber 6. The respective valve control is not shown. The charge cycle valves 7, 8 may be controlled by means of camshafts in the traditional manner, which can be implemented in a comparatively inexpensive manner. It is likewise possible to provide an electromagnetic valve control.

In addition, a fuel injector 9 is assigned to each cylinder 5, capable of injecting fuel into the respective combustion chamber 6 when controlled accordingly. The fuel injectors 9 are connected to a joint fuel supply line 15, for example, which supplies fuel under a high pressure.

The fresh gas system 3 comprises at least one joint fresh gas line 10 which is connected to a plurality of individual fresh gas pipes 11 so they communicate, each fresh gas pipe 11 leading to one of the combustion chambers 6, i.e., to one of the cylinders 5. In the present case the fresh gas line 10 and the fresh gas pipes 11 are interconnected by a fresh gas distributor 12. In another embodiment, the fresh gas pipes 11 may also be connected directly to the fresh gas line 10.

Each fresh gas pipe 11 contains a clocked valve 13 that is designed so that it can open and close the respective fresh gas pipe 11. For actuating the clocked valves 13 and the fuel injectors 9, a controller 14 is provided. This controller 14 has access to signals or to information in general that makes it possible for the controller to determine the prevailing load state of the internal combustion engine 1. The term "load state" comprises in particular the prevailing load and power output as well as the prevailing rotational speed of the internal combustion engine 1. For example, the controller 14 is connected to an engine control unit (not shown here). Likewise, the controller 14 may be integrated in terms of hardware and/or implemented in the software in such an engine control unit.

The exhaust system 4 comprises individual exhaust pipes 16 in the usual way, these pipes being connected to a joint exhaust line 18 either directly or, as is the case here, via an exhaust collector 17.

The internal combustion engine 1 and/or its fresh gas system 3 is/are dethrottled. This means that the internal combustion engine 1 and/or its fresh gas system 3 does not contain any device for load-dependent throttling of the fresh gas supply to the individual combustion chambers 6. However, the internal combustion engine 1, e.g., in the engine block 2, may have a throttle mechanism basically for safety reasons, e.g., for emergency running properties, although it does not have any throttle function in the traditional sense during normal operation. In particular, the internal combustion engine 1 and/or its fresh gas system 3 does not have a throttle valve in the fresh gas line 10. Consequently, essentially ambient pressure prevails in the line system of the fresh gas system 3, optionally throttled slightly by an air filter (not shown) and/or an intake pressure generated by the intake of the individual cylinders 5 during an intake stroke or intake cycle of the respective piston prevails in the line system of the fresh gas system 3 if this pressure is allowed through by the clocked valves 13 into the remaining line system of the fresh gas system 3. The slight vacuum optionally prevailing due to said slight throttling is at any rate definitely lower in amount than a vacuum prevailing with a conventional throttle system, i.e., with a throttled combustion engine, at least in partial-load operation.

Figure 2:
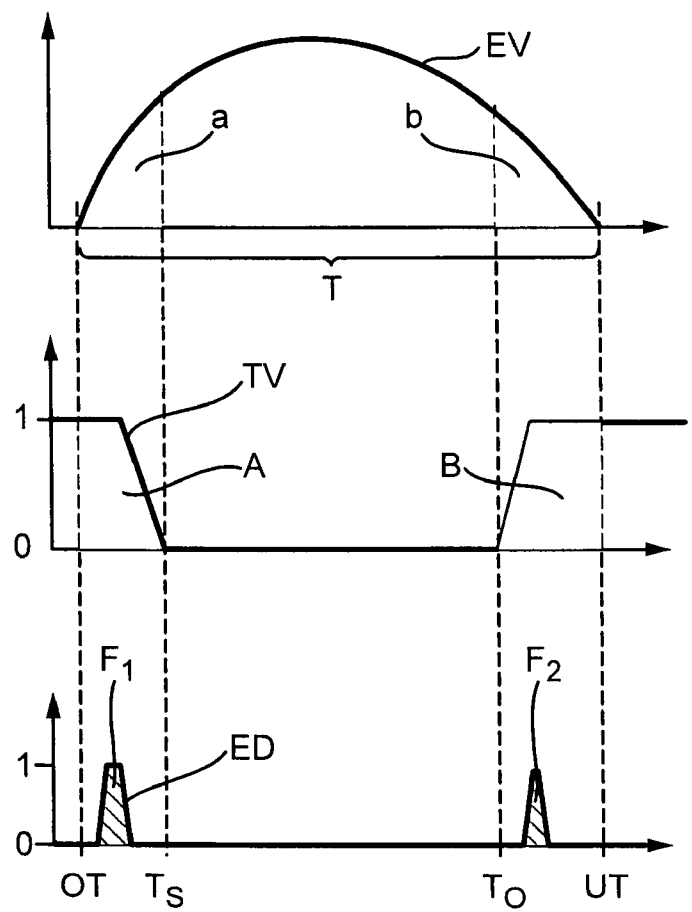

FIG. 2 shows a detail of a piston stroke on the abscissa as an example, namely an intake stroke during an intake cycle which begins at top dead center TDC of the respective piston and ends at bottom dead center BDC of the piston. The characteristics of the intake valve 7, the clocked valve 13 and the fuel injector 9 in the respective combustion chamber 6 and/or the respective cylinder 5 are plotted on the ordinate as a function of the intake stroke of the respective piston. The curve of the intake valve 7 is labeled as EV. The curve of the clocked valve 13 is labeled as TV and the curve of the fuel injector is labeled as ED.

The closed clocked valve 13 and the deactivated fuel injector 9 are each represented by a zero-line in the diagram, while the opened clocked valve 13 and the activated fuel injector 9 are each represented by a one-line. The clocked valves 13 thus have only two switch states "open" and "closed" during operation, which differentiates the clocked valves 13 from traditional throttle valves. The behavior of the fuel injector 9 is also represented here by the states "active" and "inactive" for simplification. It is clear that more complex injection processes can be implemented for the actual course of fuel injection.

The controller 14 is designed so that it can control the clocked valves 13 and the fuel injector 9 to implement an operating method for the internal combustion engine 1 as explained in greater detail below.

During operation of the internal combustion engine 1, each piston executes an intake stroke cyclically during its intake cycle, beginning at top dead center TDC and ending at bottom dead center BDC. The respective intake valve 7 is linked to the piston movement, e.g., via a camshaft control. During the intake stroke, the respective intake valve 7 has an intake time window T, which is indicated by a curly bracket in FIG. 2. The intake time window T is limited by the opening of the intake valve 7 at its beginning and by the closing of the intake valve 7 at its end. Without any restriction on generality, the opening of the intake valve 7 in the present case takes place at top dead center TDC of the piston stroke while the closing of the intake valve 7 occurs at bottom dead center BDC of the piston. In the example shown here, the intake time window T thus corresponds to the intake stroke of the respective piston.

During the intake stroke of the piston, the respective combustion chamber 6 must be loaded with fresh gas. The quantity of fresh gas, i.e., the fresh gas charge to be introduced into the combustion chamber 6, depends on the prevailing load state and the rotational speed of the internal combustion engine 1.

The present invention now proposes controlling the quantity of fresh gas to be supplied to the respective combustion chamber 8 with the help of the respective clocked valve 13.

The fresh gas is metered not by throttling the respective fresh gas pipe 11 but instead by appropriate adjustment of the time during which both the intake valve 7 and the respective clocked valve 13 are open. Essentially, the clocked valve 13 may thus open within the intake time window T, remain open for a predetermined charging time and then close again. In addition, it is fundamentally possible to implement two or more opening phases of the clocked valve 13 that are separated from one another in time but are still within the intake time window T, at least during partial-load operation of the internal combustion engine 1. However, the embodiment shown in FIG. 2 is preferred, in which the respective clocked valve 13 is cycled in such a way as to yield two charging phases separated from one another in time. FIG. 2 shows a first charging phase A, which comes at an earlier point in time while a second charging phase B comes at a later point in time. To implement these two charging phases A, B, the respective clocked valve 13 is closed when the intake valve 7 is opened, i.e., at a closing point in time $T_S$ within the intake time window T and is opened again only at a later opening point in time $T_O$, where the opening point in time $T_O$ is still within the intake time window T. Both the closing point in time $T_S$ and the opening point in time $T_O$ depend on the prevailing load state, i.e., the rotational speed of the internal combustion engine 1. The first charging phase A begins here with the opening of the intake valve 7, i.e., at top dead center TDC, and ends with the closing of the clocked valve 13, i.e., at the closing point in time $T_S$. Similarly, the second charging phase B begins with the opening of the clocked valve 13, i.e., at the opening point in time $T_O$ and ends here with the closing of the intake valve 7, i.e., at bottom dead center BDC.

The actual fresh gas charging takes place in the preferred embodiment shown here during an overlap between the opening phases of the clocked valve 13 on the one hand and the opening phase of the intake valve 7 on the other hand. This overlap is represented as hatched areas in FIG. 2 and labeled as A for the first fresh gas charging phase and B for the second fresh gas charging phase. It is noteworthy that extremely small quantities of fresh gas can be controlled with the help of these overlaps A, B. In particular, these overlaps A, B can be adjusted to be shorter in time and even significantly shorter than the minimally adjustable opening durations for the clocked valve 3 and/or for the intake valve 7. Therefore, the charging of the respective cylinder 5 in partial-load operation can be implemented with very small to extremely small quantities of fresh gas. This yields significant improvements for the emission and fuel consumption values that can be achieved.

It is noteworthy that metered addition of unthrottled quantities of fresh gas to the individual cylinders 5 and/or combustion chambers 6 is implemented here through selected control of the clocked valves 13. Pulse charging is not implemented here regularly, at least in partial-load operation. However, in full-load operation, the clocked valves 13 may be controlled for implementation of pulse charging.

According to FIG. 2, the controller 14 controls the respective fuel injector 9 as a function of the control of the respective clocked valve 13. In particular the controller 14 adjusts the chronological position of the injection time of the respective fuel injector 9 as a function of the point in time of a change in the switch position of the respective clocked valve 13. For example, the clocking of the clocked valve 13 and the respective injection process are coordinated in such a way that fuel is injected only during a charging phase A, B. The respective injection quantity is also indicated here by a hatched area and is labeled as $F_1$ for a first injection quantity and $F_2$ for a second injection quantity.

In the example shown here, a separate fuel injection is provided for each of the two charging phases A, B which occur at different points in time. Accordingly, the first injection quantity $F_1$ is injected during the first charging phase A and the second injection quantity $F_2$ is injected during the second charging phase B. Injection of fuel during the time within which fresh gas also flows into the respective combustion chamber 6 improves the formation of the mixture in the respective combustion chamber 6. An embodiment in which the chronological position of the respective injection time is selected so that the velocity of flow of the fresh gas reaches its maximum during this injection time is especially advantageous.

The interval between the two charging phases A, B depends on the prevailing load state of the internal combustion engine 1. In idling operation, i.e., at minimal partial load, said distance is at its maximum. With an increase in load, in particular with an increase in rotational speed, the distance decreases. This is achieved by either shifting the closing point in time $T_S$ of the first charging phase A toward later or shifting the opening point in time $T_O$ of the second charging phase B toward early. Likewise, the distance between the two charging phases A and B can be reduced by shifting both the closing point in time $T_S$ of the first charging phase A in the direction of late and shifting the opening point in time $T_O$ of the second charging phase B in the direction of early. The injection times for the respective fuel injector 9 are then adapted accordingly, i.e., adjusted and/or shifted with respect to their position in time.

In certain operating states, it may be desirable to provide a third charging phase chronologically in time between the first charging phase A and the second charging phase B. Fundamentally, it is then also possible to allocate an injection operation to this third charging phase.

The controller 14 and/or the programs, algorithms and engine characteristics maps stored in it and other controllers optionally connected thereto represent the equipment that makes it possible to perform the operating method described above for the internal combustion engine 1. In particular, this equipment adjusts the chronological position of the injection time of the fuel as a function of the point in time of the change in the switch position of the respective clocked valve 13 and control the clocked valves 13 for the respective cylinder 5 for metering fresh gas.

The invention claimed is:

1. A method for controlling a dethrottled internal combustion engine, the engine having a shared fresh gas line supplying fresh gas to a plurality of fresh gas pipes, each fresh gas pipe carrying fresh gas to one cylinder, at least one intake valve per cylinder, a clocked valve for each fresh gas pipe for opening and closing the respective fresh gas pipe, and a fuel injector per cylinder for metered addition of fuel, the method comprising the following steps:

adjusting a chronological position of an injection time of fuel for each cylinder as a function of a point in time of a change in a switch position of the respective clocked valve; and controlling the clocked valves so that the metered addition of fresh gas is thus performed for the respective cylinder, said step of controlling taking place at least during partial-load operation of the internal combustion engine so that at least two fresh gas charging phases spaced a distance apart from one another in time are performed during one intake stroke with each cylinder.

2. The method according to claim 1, wherein:
- a first fresh gas charging phase comprises a start of the intake stroke or an opening of the respective intake valve, and
- a second fresh gas charging phase comprises an end of the intake stroke or closing of the intake valve, and
- a third fresh gas charging phase occurs between the first and second fresh gas charging phases.

3. The method according to claim 2, wherein a separate fuel injection is performed at least during two separate fresh gas charging phases.

4. The method according to claim 1, wherein the chronological position of the injection time of the fuel is selected so that during the injection time the flow rate of fresh gas reaches its maximum.

5. A device for controlling a dethrottled internal combustion engine having a shared fresh gas line that supplies fresh gas to a plurality of fresh gas pipes which in turn carry fresh gas to each cylinder, the engine having at least one intake valve per cylinder, a clocked valve for fresh gas pipes for opening and closing the respective fresh gas pipe, and a fuel injector for each cylinder for metered addition of fuel, the device comprising:
- a device for adjusting a chronological location of an injection time of the fuel as a function of a point in time of the change in switch position of the respective clocked valve and for controlling the clocked valves for the respective cylinder for metered addition of fresh gas, the controlling taking place at least during partial-load operation of the internal combustion engine so that at least two fresh gas charging phases spaced a distance apart from one another in time are performed during one intake stroke with each cylinder.

6. A dethrottled internal combustion engine, comprising: a shared fresh gas line which supplies fresh gas to a plurality of fresh gas pipes, each fresh gas pipe carrying fresh gas to a cylinder; at least one intake valve per cylinder; a clocked valve for each fresh gas pipe for opening and closing the respective fresh gas pipe; a fuel injector for each cylinder for metered addition of fuel; and a device for adjusting a chronological location of an injection time of the fuel as a function of a point in time of the change in switch position of the respective clocked valve and for controlling the clocked valves for the respective cylinder for metered addition of fresh gas, the controlling taking place at least during partial-load operation of the internal combustion engine so that at least two fresh gas charging phases spaced a distance apart from one another in time are performed during one intake stroke with each cylinder.

* * * * *